March 23, 1965  R. W. MATTSON  3,174,598
OVERRUNNING CLUTCH

Filed Jan. 24, 1962  2 Sheets-Sheet 1

INVENTOR.
RICHARD W. MATTSON
BY
Souther & Stoltenberg
ATTORNEYS

March 23, 1965

R. W. MATTSON 3,174,598

OVERRUNNING CLUTCH

Filed Jan. 24, 1962

INVENTOR.
RICHARD W. MATTSON
BY
Souther & Stoltenberg
ATTORNEYS

United States Patent Office 3,174,598
Patented Mar. 23, 1965

3,174,598
OVERRUNNING CLUTCH
Richard W. Mattson, Toledo, Ohio, assignor to Eltra
Corporation, Toledo, Ohio, a corporation of New York
Filed Jan. 24, 1962, Ser. No. 168,487
2 Claims. (Cl. 192—45)

This invention relates to overrunning clutches such as roller-type overrunning clutches for conventional cranking motors used to start internal combustion engines.

The invention comprehends a simplified overrunning clutch mechanism of the roller type having an improved construction and also an improved operational characteristic, including an extended torque-handling capacity over previous roller clutches. The improved clutch also can be fabricated with reduced manufacturing costs as a result of fewer parts and simplification of the parts to facilitate the production and assembly of the clutch mechanism.

As applied to an engine cranking motor, the invention comprises a roller-type clutch mechanism, which is driven by an electric starting motor; including a driving member in the form of a housing, and a driven member in the form of a cylinder integral with a conventional pinion gear. The composite housing is provided with a plurality of cam surfaces formed therein which cooperate with a roller-and-cage assembly to establish a driving relation between the composite housing member and the cylinder on the pinion gear when an internal combustion engine is to be started, and to break the driving relation for an overrunning action between the driving and driven members when the internal combustion engine becomes self-operating and overruns the starting motors.

Conventional roller-type overrunning clutches of the type using a plurality of individual rollers with bias springs have been undesirable for various reasons such as the relatively high cost of producing such clutches, and their unsatisfactory operational characteristics. One of the problems in particular has been the independent and random movement of the individual rollers which results in erratic roller loading on lock-up and, therefore, unequal stress distribution. This excessive random movement of the rollers also allows considerable skewing of the rollers which produces high local stress areas eventually resulting in early failure of the clutch mechanism. The high cost of producing such clutches has been due, in part, to the large number of related elements, particularly springs, and also to the complicated method of assembling the various members during manufacture. The springs are not only costly to produce but are costly to assemble in the mechanism from a labor standpoint, since a complicated and time-consuming method must be used to prevent the springs and various other parts from spewing out of position during the assembly. Moreover, the use of a large number of individual springs in conventional roller clutches requires a rather large clutch housing for a given load requirement. An improved overrunning clutch is provided by this invention which uses the same size housing with a single bias spring so that additional space is available for additional rollers and cams within the same volume, which allows the stress from a given torque loading to be distributed over more rollers. For example, in a typical roller clutch design it is possible, by using the teachings of the invention, to double the number of roller and cam units within a given size housing.

It is, therefore, a principal object of this invention to provide an improved roller-type overrunning clutch which is more economical to manufacture, more reliable in operation, and more economical of space by possessing additional torque capacity over conventional clutches of a comparable size.

Another object of this invention is to provide an improved roller-type overrunning clutch which utilizes a roller-and-cage design, which limits random and/or skewing movement of the individual roller members during operation of the clutch.

Another object of the invention is to provide an improved roller-type overrunning clutch which uses a cage member for containing the roller to cause all of the rollers to move simultaneously when actuated by a single bias spring, thus eliminating the need of a number of springs to move each roller individually.

It is another object of this invention to provide an improved roller-type overrunning clutch having a roller-and-cage assembly positioned in a composite housing, the housing comprising a main outer housing portion having good toughness characteristics with a harder liner member having inner cam surfaces permanently positioned in the outer housing member.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings.

Figure 1:
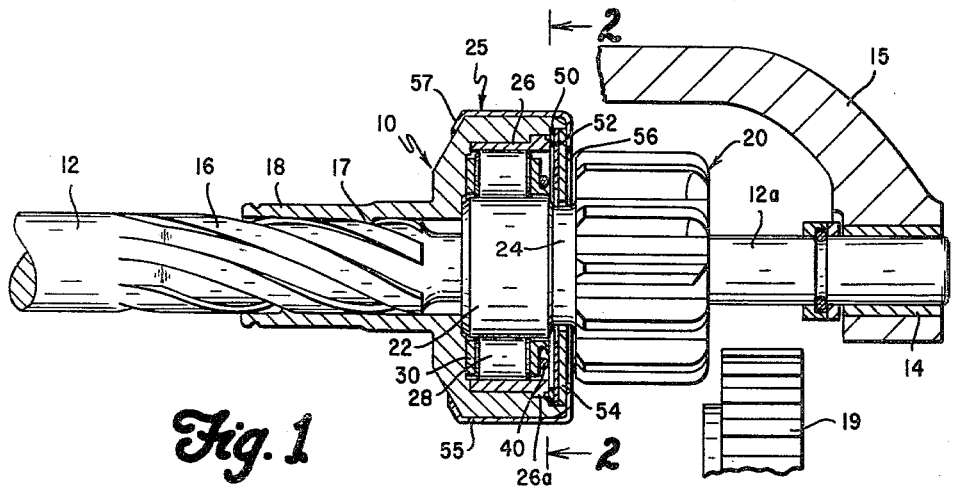
FIGURE 1 is an elevation, partly in section, showing a clutch mechanism incorporating the invention positioned on a portion of a starting motor shaft.

Referring to the drawings, particularly to FIGURE 1, a starter clutch assembly 10 is shown positioned on a portion of the shaft 12 of a conventional electric starting motor (not shown). A reduced end portion 12a of the shaft 12 is rotatably supported in a bearing 14 suitably mounted in a portion of the starter housing 15. The enlarged portion of the shaft 12 is provided with a plurality of external spiral splines 16 which cooperate with similar internal splines 17 (FIGURES 1 and 3) formed in the bore of an integral tube portion 18 of the clutch 10 to impart a positive longitudinal motion to the clutch during its rotation by the shaft 12 into and out of driving relation with a flywheel ring gear 19 of an internal combustion engine. Extending from the forward end of the clutch assembly is a pinion gear 20 which is journaled on the reduced portions 12a of the shaft which provides the driving connection between the clutch mechanism 10 and the ring gear 19. The pinion gear 20 is conventional in configuration, having a plurality of toothed portions, which mesh with similar toothed portions on the ring gear 19. It is provided with a reduced cylindrical end portion 22 which is spaced from the toothed portions by an indented race 24 and projects into the housing 25 of the clutch assembly. The race 24 provides a means of retaining the pinion gear in assembled relation in the clutch assembly, which will be better understood hereinafter.

The clutch housing 25 consists of a cup-shaped member which is integral with the splined tube portion 18 and a hardened steel liner member 26 which is permanently positioned in the cup-shape cavity of the housing by brazing or the like. The liner 26 is provided with a number of internal cam surfaces 27, (FIGURES 2 and 3) which are parallel with the shaft 12 and cooperate with an equal number of steel roller members 28 to provide a locking means between the driving housing 25 and the cylindrical driven portion 22 integral with the pinion gear 20, which will be better understood hereinafter. The liner member 26 provides a more economical and practical method of forming hardened surfaces in the housing for the rollers 28 to react against without fabricating the entire housing 25 of a brittle metal.

In starter clutches, a housing member such as housing 25 must satisfy a number of requirements which are not consistent. First, it must present an exceedingly hard wearing surface to the rollers at the cams, so that the rollers will not penetrate the surface of the cams due to the very high local loading when in a locked position. Second, the high local loading at the cam induces high deflections in the housing, requiring a tough material capable of absorbing large strains without rupture, otherwise the housing must be very heavy to have the required strength to minimize the deflections. The first requirement is not compatible with the second when using a housing made of a single material, and the second requirement cannot be met in a practical manner due to space limitations. In addition, large deflections are usually desirable in shock loaded devices because the large deflections produce a spring-like action which reduces the deceleration rates of the input masses. In other words, a starting mechanism which has sufficient resiliency to provide a smooth gradual application of torque between a starting motor armature and the ring gear of a quiescent internal combustion engine with its high inertia will transmit a starting movement to the ring gear of the engine within the limitations of the materials used, thus preventing damage to any of the interconnecting parts. This is particularly effective when the engine is cold or with extremely low temperatures encountered during cold weather.

The liner 26 is an open-ended tube formed of a steel which can attain very high physical properties during heat treatment of the housing assembly, while the outer housing member 25 is formed of another type steel which provide a tough and resilient support for the liner. The fact that the liner is an open-ended tube facilitates forming the cam surfaces 27 in the liner by the simple well known method of broaching. This construction also has the advantage that both right and left hand clutch housings can be produced by the simple expedient of providing a collar portion 26a on the opposite end of the liner and inserting and brazing the liner in the housing in an inverted position.

The roller members 28 are maintained in spaced relation in the clutch housing between the cylinder 22 and the liner 26 by a cage member 30 having a toroidal configuration. The cage member 30 (FIGURES 4 through 7) has a central opening 32 embracing the cylinder 22, with the torus portion being provided with side walls and webs to define a number of rectangular openings 34 extending radially through the annular wall 35 to house the roller members 28. The openings 34 are symmetrically spaced so that pairs are positioned in diametrically opposed relation with all of the corresponding walls of the pairs of openings positioned in the same planes. This arrangement results in integral web portions 36 between the openings having sector-shaped configurations.

The openings 34 in the cage member 30 are adapted to embrace the roller members 28 with a good working fit with minimum tolerance to prevent skewing of the rollers. The openings retain the roller members in predetermined spaced relation with each other and with the cam surface 27 in the liner 26 of the driving member. To insure proper lubrication for freedom of movement of the rollers in the openings 34 during operation of the clutch, additional clearance is provided in the openings 34 by forming arcuate undercuts 37 and 38 in the adjacent walls of the sector-shaped portions 36. The improved lubrication obtained by the free circulation of the lubricant improves the operation of the clutch to a surprising degree and helps to prevent destructive loading of the parts when heavy loads are applied to the clutch.

To facilitate the assembly of the rollers 28 in the cage member 30, the sector-shaped portions 36 are each provided with two relatively small upset portions 39 (FIGURE 7), which project into each opening 34 to act as stops for the rollers. These upset portions 39, therefore, prevent the rollers from passing through and entering the central opening 32 when they are assembled in the openings 34, as shown by the phantom roller 28 in FIGURE 6.

When the clutch mechanism is idle, all of the roller members 28 in the cage member 30 are maintained in contact with their respective cam surfaces 27 by a single spiral spring 40 biased to react on the cage member 30. This is accomplished by anchoring the outer end 42 (FIGURE 2) of the spring to a pin-like projection 44 formed in the end wall of the composite housing 25, and connecting its opposite inner end 45 to the cage member 30. The inner end 45 of the spring is bent transversely (not shown), which portion is inserted in a hole 46 (FIGURE 4) provided in the forward end wall of the cage member 30. The spring 40 is maintained in a given plane and in a predetermined radial position by an integral collar 47, provided on the cage member about its central opening 32.

The provision of the cage member and the single biasing spring therefor are important features of the invention to maintain the rollers in operative position. The cage permits only a limited amount of random motion of the roller members, so that all rollers must be moved in synchronism during operation. No one roller, therefore, may move toward lock-up position independently of the other rollers, but all are moved together, so that all of the rollers share the shock of sudden torque loads. Similarly all of the rollers will be released simultaneously when the rotation of the cage member is reversed. The cage member also permits only a limited skewing motion of the rollers, which is a force developed if the rollers are squeezed between non-parallel surfaces. This is a very common condition in clutch operation resulting from variations in the dimension allowed by tolerances in manufacturing. It is desirable to limit this non-parallel motion to the rollers because extreme skewing produces high local stress areas in the locking members, resulting in damage to the locking surfaces and early failure of the clutch.

The use of the cage eliminates the necessity for a large number of individual bias springs for the rollers since a single larger spring produces the same result by acting on the cage. In addition to the obvious reduction in component parts of the clutch, this feature provides useful space economy in which additional roller and cam units can be positioned, so that the torque loading is carried by more units.

The clutch mechanism, as shown in FIGURE 1, is held in assembled relation by an outer two-piece locking ring 54 positioned in the open end of the housing 25. A washer 52 and a sealing gasket 50 are positioned behind the divided ring 54 to maintain the cage and roller assembly and the spring 40 in assembled operative relation in the housing 25. The central aperture of the locking ring 54 is dimensioned to extend into the annular race 24 of the pinion 20 to thereby maintain the pinion and its integral cylinder 22 in assembled relation in the clutch mechanism. A cup-shaped member 55 having an aperture 56 in its base is positioned over the assembled members and the lip 57 thereof is rolled over the rear face of the housing 25 to complete the assembly.

Figures 2, 3:
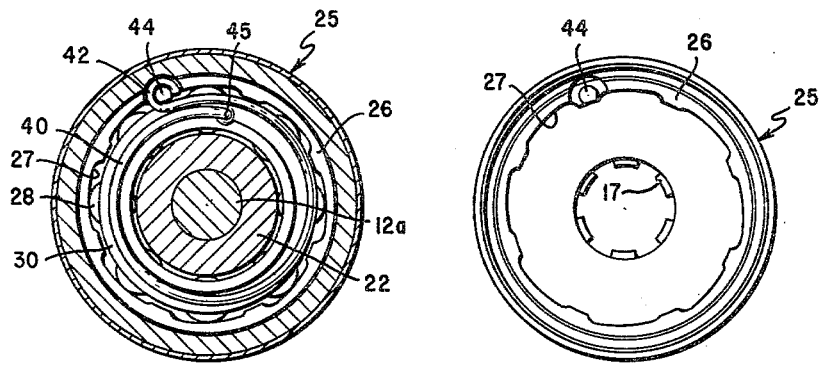
FIGURE 2 is a sectional view through the clutch taken on line 2—2 of FIGURE 1.
FIGURE 3 is an end elevation of the open end of the clutch housing member.
Figure 4:
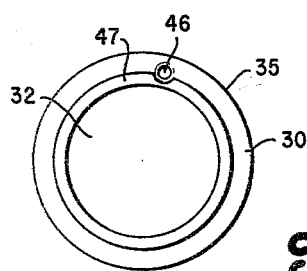
FIGURE 4 is an end elevation of the cage member of the clutch mechanism.
Figure 5:
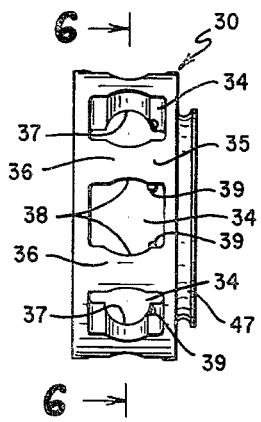
FIGURE 5 is a side elevation of the cage member.
Figure 6:
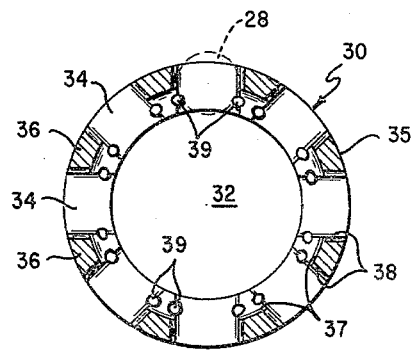
FIGURE 6 is a sectional view through the cage member taken on line 6—6 of FIGURE 5.
Figure 7:
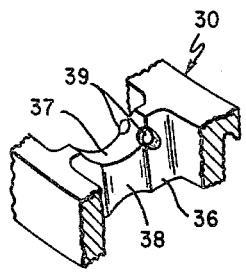
FIGURE 7 is a partial isometric view of a portion of the cage member.

To summarize the operation of the clutch mechanism, assume the pinion gear 20 to be in driving relation with the ring gear 19 and the starting motor capable of imparting clockwise motion to the clutch housing 25 through the shaft 12, as viewed in FIGURES 1 and 2. The spring 40 is constantly urging the cage 30 in a counter clockwise direction, causing the rollers 28 to ride up the cams 27 while in contact with the cylindrical portion 22 of the pinion. The clockwise motion of the housing will cause an immediate locking action by further wedging the rollers between the high of the cam surfaces and the cylindrical surface of the pinion gear. The pinion, being locked in driving position in the clutch mechanism, will then transmit rotary motion to the ring gear 19 to thereby rotate the flywheel of the internal combustion engine.

When the engine fires, the pinion speed will exceed the speed of the starter motor, causing the pinion 20 and its cylindrical portion 22 to rotate in a clockwise direction at a higher rate of speed than the housing 25, thus releasing the roller load. When this takes place, the bias of the spring 40 on the cage 30 will maintain the rollers 28 in light frictional engagement with the cylinder on the pinion and with the housing during normal over-running speeds. This permits the rollers to pick up the torque load for continued cranking in the event of the firing was a "false start."

In the event that after starting the operator causes the engine to run at an excessive rate of speed while keeping the pinion gear engaged, the starter motor and clutch housing may tend to over-speed due to clutch over-running friction. During this type of over-running, however, the centrifugal force on the rollers increases and they tend to move backward and outward into the deep part of the cam. By careful spring selection, then, it is possible to control the over-running friction of the clutch to discourage over-speeding of the armature during normal operation yet supply the desired bias force to insure proper lockup under cold temperature conditions and after normal over-runs due to false start.

Figure 8:
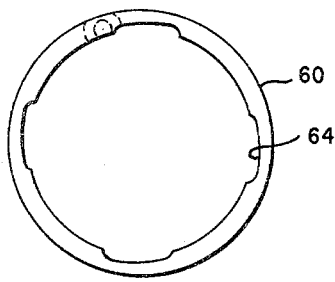
FIGURE 8 is an end elevation of a modified form of the liner members of the clutch mechanism.
Figure 9:
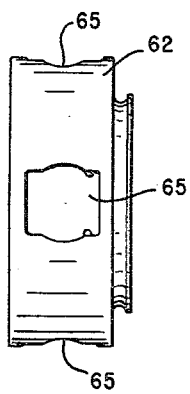
FIGURE 9 is a side elevation of a modified form of the cage member of the clutch mechanism.

In FIGURES 8 and 9 an alternate form of the invention is shown wherein a liner 60 and a cage member 62 are provided, suitable for use in a four-roller clutch assembly. The parts are identical in configuration except for the number of cam surfaces 64 in the member 60 and the number of openings 65 in the member 62. If desired, the member 62 can be identical with that shown in FIGURES 5 and 6 with a roller being positioned in every other opening 65. The operation of the parts and the mechanical principles involved in a four-roller clutch are essentially the same as that of the eight-roller clutch described hereinbefore. The four-roller clutch assembly is designed for medium duty applications, whereas, the eight-roller assembly is more suitable for medium-heavy duty applications, having reference to the size of the internal combustion engine with which it is to be used. Either of these clutches can be varied in size to satisfy the load requirements of a given application and yet utilize the same mechanical principles.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the followig claims beyond the requirements of the prior art.

What is claimed:

1. In an overrunning clutch comprising inner and outer members, said outer member comprising a cup-shaped housing fabricated from a material selected for its toughness having an inner cylindrical surface, a liner for said housing fabricated from a material selected for its hardness having a cylindrical outer surface positioned in touching relation with the inner cylindrical surface of the outer member, a layer of bonding material between said outer member and liner permanently positioning the liner within the outer member, said liner having a plurality of symmetrically space cam surfaces formed on its inner annular surface, said inner member comprising a cylindrical portion projecting into the outer housing from its open side, a cage member of integral construction positioned between the cylindrical surface on the inner member and the cam surfaces on the inner surface of said liner, said cage member being dimensioned to extend substantially the entire radial distance therebetween and provided with diametrically-disposed pairs of spaced radial apertures of rectangular conformation to cooperate with the cam surfaces on the inner surface of said liner and the outer cylindrical surface of the inner member, the corresponding sides of the pairs of rectangular apertures being in the same plane, a plurality of cylindrical rollers adapted to be tures to lock between the outer cylindrical surface of the inner member and the cam surfaces on the inner surface of said liner at selected positions without skewing, one roller being provided for each rectangular aperture and cooperating cam surface on the liner, and a single pre-stressed spring having its outer end anchored to the outer member and its inner end connected to the cage member to urge all of the rollers simultaneously into locking position between the cam surfaces of the liner and the cylindrical inner member.

2. In an overrunning clutch comprising inner and outer members, said outer member comprising a cup-shaped housing fabricated from a material selected for its toughness having an inner cylindrical surface, a liner for said housing fabricated from a material selected for its hardness having a cylindrical outer surface positioned in touching relation with the inner cylindrical surface of the outer member, a layer of bonding material between said outer member and liner permanently positioning the liner within the outer member, said liner having a plurality of symmetrically spaced cam surfaces formed on its inner annular surface, said inner member comprising a cylindrical portion projecting into the outer housing from its open side, a cage member of integral construction positioned between the cylindrical surface on the inner member and the cam surfaces on the inner surface of said liner, said cage member being dimensioned to extend substantially the entire radial distance therebetween and provided with diametrically-disposed pairs of spaced radial apertures of rectangular conformation to cooperate with the cam surfaces on the inner surface of said liner and the outer cylindrical surface of the inner member, the corresponding sides of the pairs of rectangular radial apertures being in the same plane, a plurality of cylindrical rollers adapted to be positioned by a working fit in the rectangular radial apertures to lock between the outer cylindrical surface of the inner member and the cam surfaces on the inner surface of said liner at selected positions without skewing, one roller being provided for each rectangular aperture and cooperating cam surface on the liner, undercuts in said radial apertures to form passageways for grease to flow between adjacent rectangular radial apertures in which the cylindrical rollers are positioned and also between the locking surfaces for the rollers, and a single pre-stressed spring having its outer end anchored to the outer member and its inner end connected to the cage member to urge all of the rollers simultaneously into locking position between the cam surfaces of the liner and the cylindrical inner member.

References Cited by the Examiner

UNITED STATES PATENTS

| | | | |
|---|---|---|---|
| 1,946,177 | 2/34 | Neurath | 192—45 |
| 2,068,773 | 1/37 | Slider | 192—45 |
| 2,209,459 | 7/40 | Hill | 192—45 |
| 2,245,431 | 6/41 | Critchfield | 192—45 |
| 2,759,364 | 8/56 | Lewis | 192—45 |
| 2,998,113 | 8/61 | Marland | 192—45 |
| 3,011,606 | 12/61 | Ferris et al. | 192—45 |
| 3,055,471 | 9/62 | Worn et al. | 192—38 |
| 3,104,744 | 9/63 | Wade | 192—45 |

DAVID J. WILLIAMOWSKY, *Primary Examiner.*